Inventor
Edward H. Waugh
By H.L.&C.L. Reynolds.
Attorneys

June 16, 1925.
E. H. WAUGH
FISH DRESSING MACHINE
Filed July 30, 1923
1,542,196
6 Sheets-Sheet 2
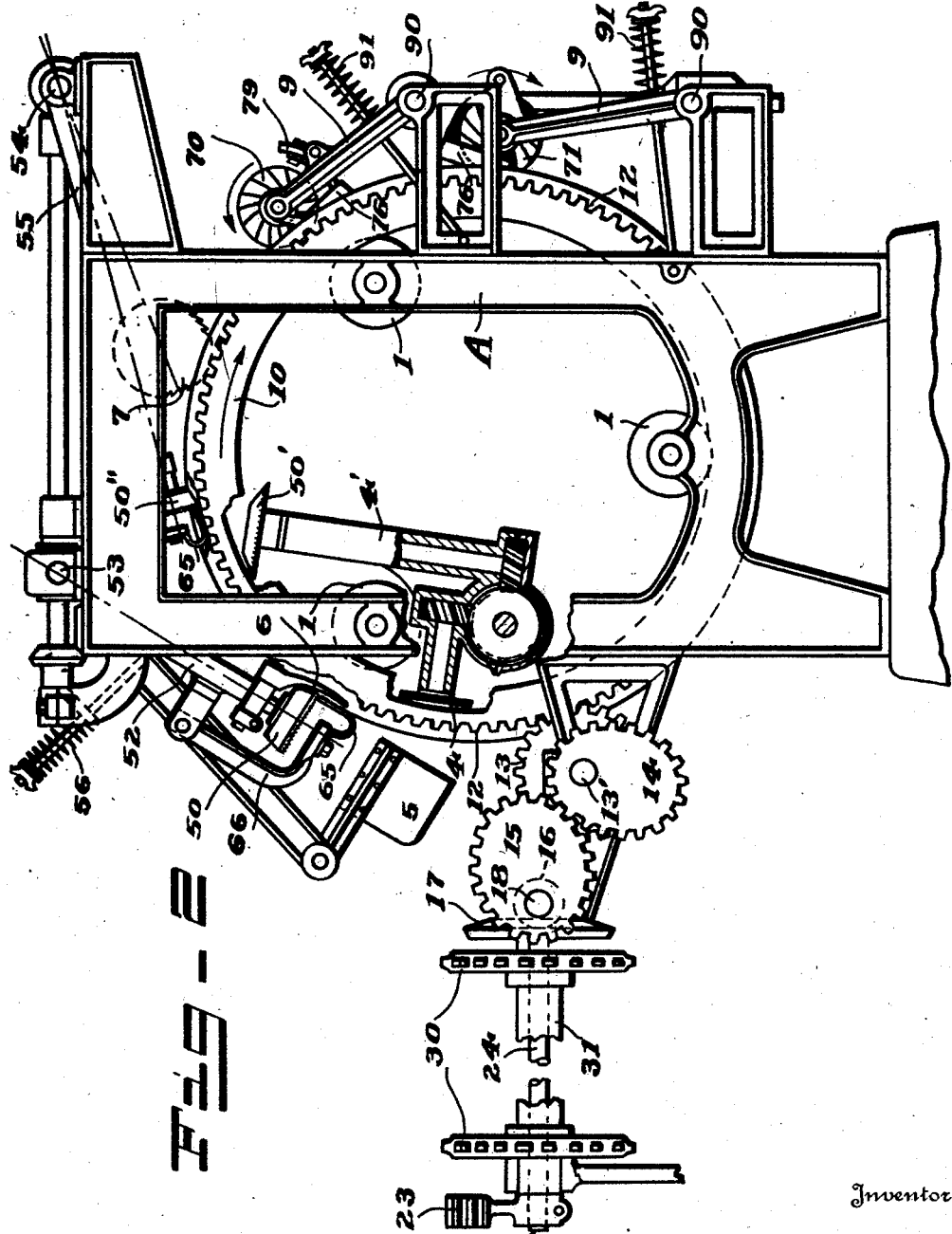
Inventor
Edward H. Waugh
By H. L. & C. L. Reynolds.
Attorneys

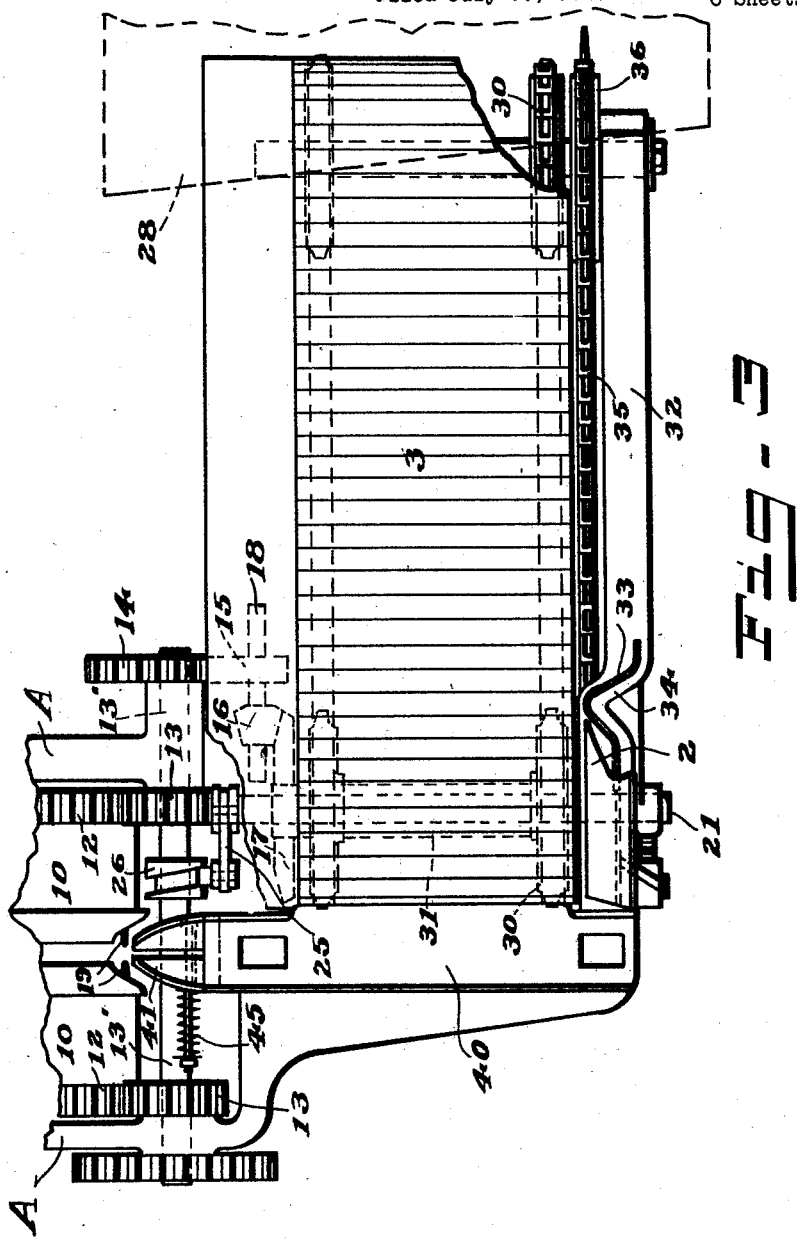

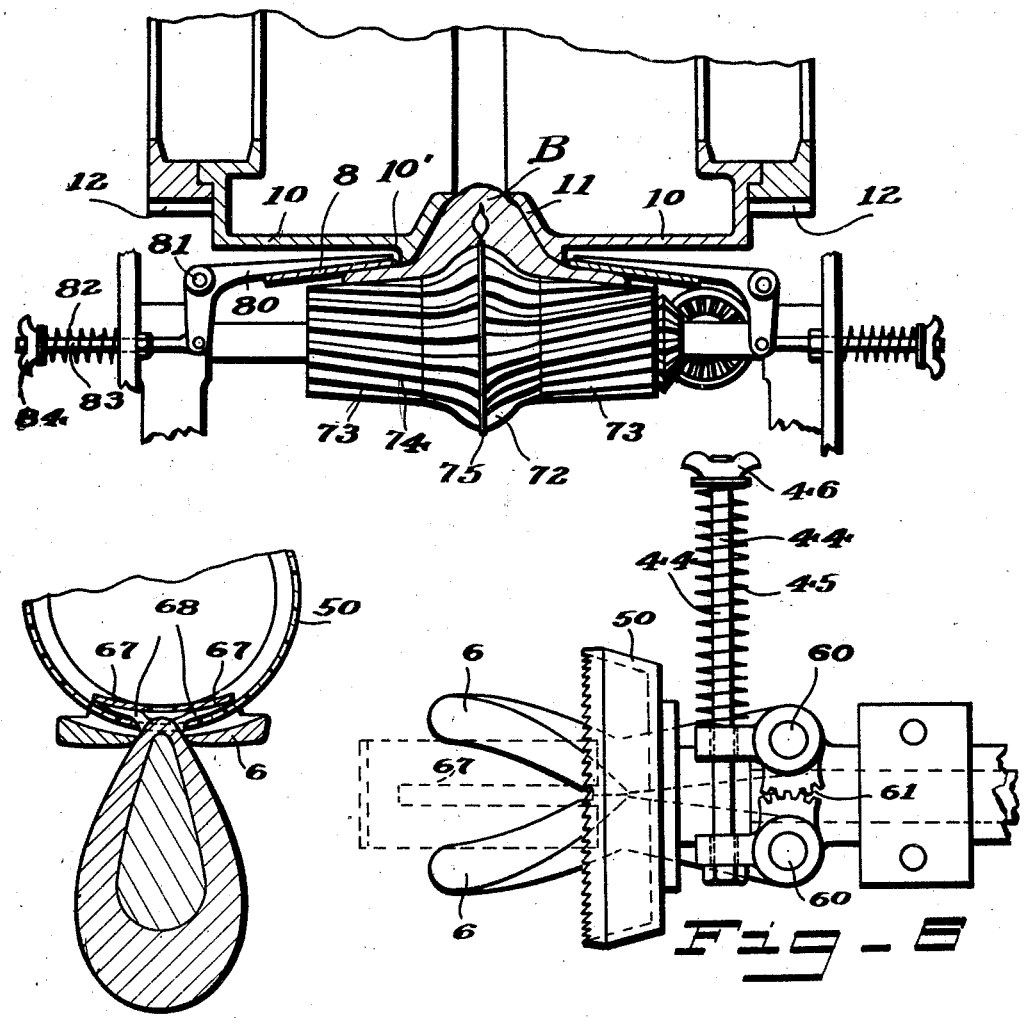

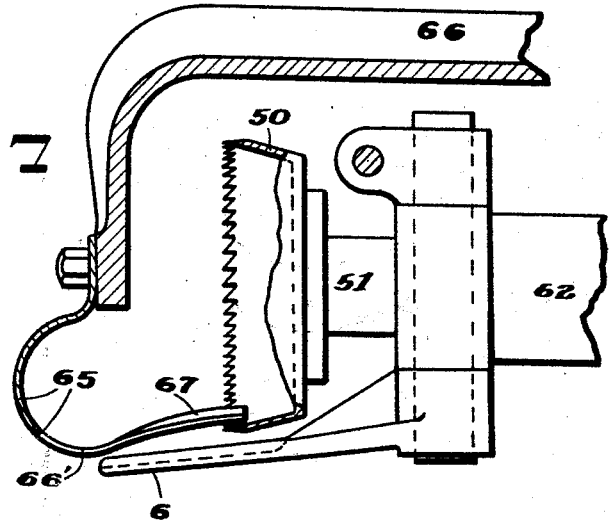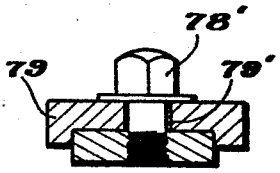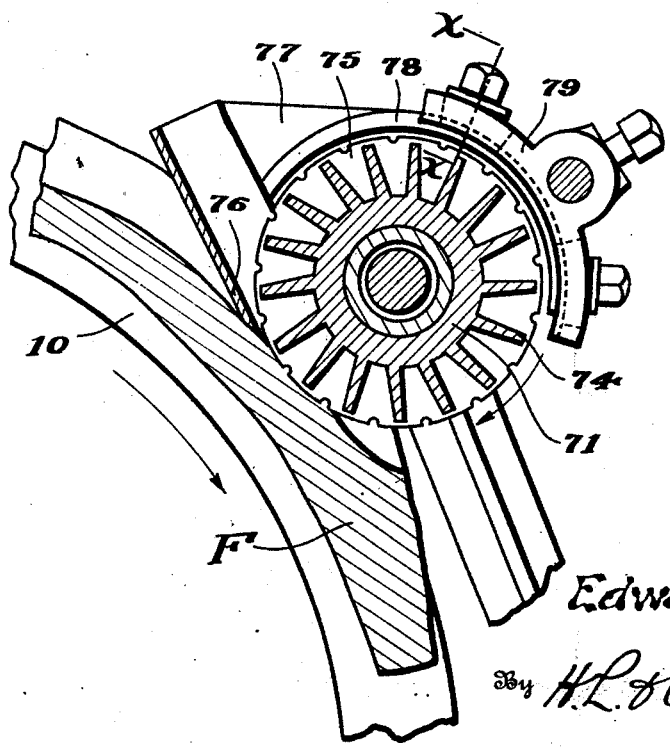

June 16, 1925.

E. H. WAUGH 1,542,196

FISH DRESSING MACHINE

Filed July 30, 1923     6 Sheets-Sheet 6

Inventor

Edward H. Waugh

By H.L.H.C.L.Reynolds.

Attorneys

Patented June 16, 1925.

1,542,196

UNITED STATES PATENT OFFICE.

EDWARD H. WAUGH, OF SEATTLE, WASHINGTON, ASSIGNOR TO SMITH CANNERY MACHINES CO., OF SEATTLE, WASHINGTON, A CORPORATION OF WASHINGTON.

FISH-DRESSING MACHINE.

Application filed July 30, 1923. Serial No. 654,627.

*To all whom it may concern:*

Be it known that I, EDWARD H. WAUGH, a citizen of the United States of America, and resident of the city of Seattle, in the county of King and State of Washington, have invented certain new and useful Improvements in Fish-Dressing Machines, of which the following is a specification.

My invention relates to fish dressing machines which are designed for the purpose of butchering and removing heads, tails and fins of fish, preparatory to canning the same.

The general type of machine to which my invention applies is that shown in the patent to Smith, No. 1,034,525, dated August 6, 1912.

The object of my invention is to provide a machine in which the various operations of butchering and cleaning the fish may be better done than is done by the machine of said patent.

The specific features of my invention which I believe to be new and upon which I desire to secure a patent will be hereinafter specifically described and then pointed out by the claims terminating this specification.

The accompanying drawings show my invention in the type of construction which is now preferred by me.

Figure 2 is a side elevation of the machine with portions thereof broken away and other parts removed which do not have definite bearing upon the present improvement.

Figure 3 is a plan view of the fish beheading means together with the apron by which the fish are presented to said beheading means, and also of a portion of the conveyor upon which the cleaning of the fish is accomplished.

Figure 4 shows a section through a portion of the conveyor and also associated therewith one of the scrapers used for cleaning the fish.

Figure 5 is a transverse sectional view of the scraper shown in Figure 4, taken upon the central transverse plane thereof.

Figure 6 is a top plan view of the rotary cutter with its associated presser parts, which is employed for removing the anal and ventral fins of a fish.

Figure 7 is a side view with portions thereof in section, on a central plane showing the same parts as that in Figure 6.

Figure 9 is a side view of one of the plates of the stop device shown in Figure 8.

Figure 15 is a section taken upon the line $x$—$x$ of Figure 5, illustrating the manner of supporting and adjusting the guard or shield relative to the scraper.

Figure 16 is a view similar to that shown in Figure 12, illustrating the action of the parts when removing a different set of fins.

Figure 1:
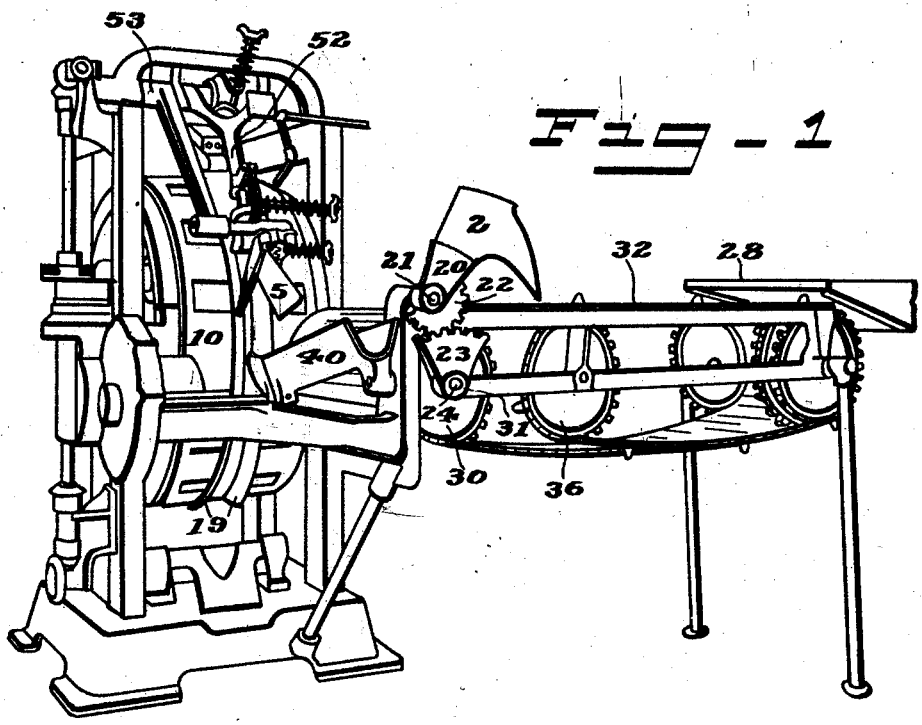
Figure 1 shows in perspective the assembled machine, indicating the general character of the same.

It has been found in practice that machines of the type from which the present machine has been developed, while highly efficient for butchering and cleaning the fish, have always shown a certain amount of inefficiency in doing the desired work perfectly. It has therefore been necessary in actual practice to provide a crew, which in the cannery are referred to as "slimers," for inspecting and perfecting the work of the machine. For instance, it has been necessary often to add a little hand work to the work as accomplished by the machine in order to secure perfect cleaning of the fish. It is the object of the present invention to perfect the operation of the various parts of the machine so that the necessity for such a crew of slimers may be done away with as fully as possible.

The particular machine from which the present machine has developed resembles the present machine in having a carrier upon which the fish are secured while the butchering and cleaning operations are performed, which carrier conveys the fish through a definite path during the passage, through which the fish is successively acted upon by the parts of the apparatus to perform the desired and necessary operations. Such carrier, in the particular machine in question, consists of two ring members mounted so as to turn about the same axis and lying closely parallel to each other, the fish being held in the space between the two rings while being operated upon.

In the drawings, A represents the frame along which the various parts of the fish cleaning mechanism are mounted. The particular construction and shape of this frame is whatever may be desired for the convenient placing and operation of the various parts. Such a frame has mounted thereon rollers 1 upon which the rings 10 which form the carrier are mounted. The rings 10 form a rotative trackway turning upon the guide wheels 1. Two of these rings are employed, these being separated so as to leave a gap between them in which is placed the fish while being acted upon. These rings and a section of the fish, B, are clearly shown in cross section in Figure 4.

The rings 10, at the edges which are adjacent to each other, each have a flange 11 which is recessed backward towards the center and thus forms a trough which is roughly of a V-shape, for the reception therein of the body of the fish. The general construction of these rings and the means for holding the fish in place thereon does not differ in any material way from the device shown in the said patent to Smith. It is therefore not deemed necessary here to go into detailed description of the manner of operating the carrier and the means by which the fish are held thereon.

Figure 14:
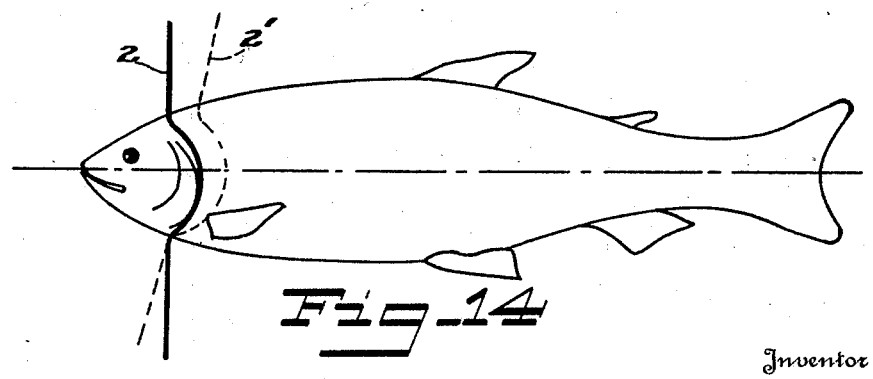
Figure 14 shows in outline and in side view, a fish and the relationship of the be-heading knife thereto, illustrating how the angular positioning of the fish upon the endless carrier belt may be made to affect the position of the cut when be-heading.

Associated with the fish cleaning apparatus carried by the rings 10, is the fish beheading means which are shown in plan in Figure 3 and in perspective in Figure 1. The be-heading means proper consists of a knife 2 which is mounted upon an arm 20, pivoted at the point 21 so as to have a movement through a circular arc. The construction of this knife and its operation are in the main the same as shown in said patent to Smith. The knife, as indicated in the above figures and also in the diagram, Figure 14, is bent in transverse shape to conform somewhat to the shape of the fish's gills, so that the head may be cut off close to the gills with as little waste of good meat as possible. This particular shape of the knife, however, is an old one and is not the subject of my present invention.

In the present machine I have shown a means for the mechanical presentation of the fish to the knife such that the fish may be accurately positioned and thereby secure an exact positioning of the cut made in beheading the fish, relative to the gills. Such means comprise as one member, a conveyor apron or belt 3. This is endless and passes over wheels as 30 at each end, and passes close alongside of the path of movement of the knife 2. Associated with this is an endless link belt, as 35. This is mounted upon gears 36 at each end thereof. The chain 35 is, however, not as long as the conveyor belt 3. At the end at which the fish are fed thereto, the gears 30 and 36 which carry, respectively, the apron and the positioning chain 35, are mounted upon the same shaft. At the other end, however, the gear 36 of the positioning belt 35 is located nearer to the receiving end of the apron than is the shaft 31 upon which the gears 30 at this end of the apron are mounted. This difference in length is enough so that the fish are released from the positioning chain 35 before the be-heading knife 2 acts thereon.

Figure 10:
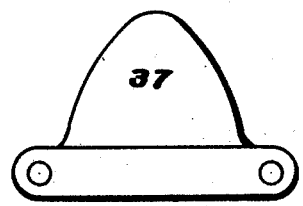
Figure 10 is a side elevation and Figure 11 a top plan, of one of the links in the chain which is used for accurately positioning the fish preparatory to presentation to the be-heading knife.
Figure 11:
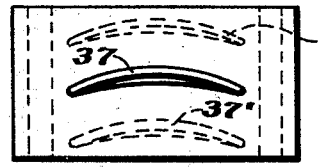

The positioning chain 35 has therein a certain number of links of special type, one of which, in the type of construction now preferred, is shown in side elevation and top plan in Figures 10 and 11. This link has a positioning pin, web or fin 37, extending upwardly therefrom. This is preferably made as a web or fin similar in its general construction to that illustrated in said figures. It is relatively thin and extends in the direction of the length of the link a distance corresponding approximately to the maximum length which may be easily and certainly accommodated within the gill opening of the fish. As said gill opening is not a straight line but is curved somewhat, I prefer also that this web be of curved outline as seen from the face of the link, as it is shown in Figure 11. This web or fin is also preferably tapered on its end edges as is shown in Figure 11 so that its extreme point is relatively small and may be readily inserted in the gill opening.

It is readily seen that with a positioning device of this character, properly timed and positioned with relation to the point at which the be-heading is done and the time of operation of the be-heading knife, the fish may be very accurately positioned for action of the said knife thereon. To secure the maximum accuracy in positioning the fish, the angular position of the fin 37 relative to the link should also correspond with the position of the knife, so that the position of the fin or web 37 is such that if the chain 35 extended as far as does the apron 3, the fin 37 would be just outside of the path of movement of the knife. The fish conveying and presenting apron or web 3 and the positioning chain 35 move in synchronism. Consequently, if the fish be accurately located upon the apron 3 it will remain accurately positioned thereon after the fin 37 has been withdrawn. This withdrawal of the fin 37 is secured by stopping the chain 35 before it reaches the cutting position.

The closeness with which the knife cuts to the fish gills may be varied in the same machine by varying the position of the web or fin 37 transversely of the link. In some cases it may be desired to have the be-heading knife actually enter the gill opening and in some cases it may be desirable to have the knife cut farther to the rear of the gill opening. This may be done on the same machine, either by having the fins or webs 37 adjustably secured to the links and moved in or out, or by having links in which the fin 37 is positioned removable and substituting links of one position for links of a different position. The range of adjustment in this matter is indicated by the two dotted positions 37' for such web, as shown in Figure 11. It is a simple matter to substitute one set of links for another and in this manner the exact point of operation upon the fish of the be-heading knife 2 may be adjusted.

It is desirable that the conveyor 3 which presents the fish to the be-heading mechanism should have as slow a rate of movement at the instant of be-heading as is feasible. It is also desirable that the movement of such apron should be of a gradual and easy character and that movement be not jerky, as, if it were a jerking movement, the fish accurately positioned by the chain 35, might be disturbed in its position upon the carrier 3 after the fins 37 were released therefrom and before be-heading occurs. For this reason I have adopted for the operation of such apron, a mechanism which has a variable rate of movement, being relatively much more rapid at one time than at another. As a suitable means for securing such action I have adopted a pair of elliptical gears. These gears are clearly shown in Figure 2 and are also indicated in Figure 3. The rings 10 which form the main element of the carrier, are provided with teeth 12 which mesh with a pinion or smaller gear 13. Upon the same shaft which carries the gear 13 is mounted an elliptical gear 14, this latter meshing with a gear 15 mounted upon a shaft 18. This shaft has a driving connection with the shaft 31 upon which the gears 30 are secured, which gears form the means by which the apron 3 is moved. Such driving connection is suitably secured by means of the bevel pinion and gear 16 and 17, mounted respectively upon the shafts 18 and 31.

It is evident that with a driving device of this character the movement of the conveyor 3 will be much more rapid at one time than at another. The relative movement of the conveyor and of the be-heading knife 2 is such that the cutting action of the knife is timed to correspond with the slowest movement of the conveyor 3.

The be-heading knife 2 is mounted upon an arm 20 which is secured to a stub pivot shaft 21 (Figure 1). This shaft has secured thereto a segment gear 22 which meshes with a complemental segment gear 23 carried by a shaft 24, which shaft 24 lies within the axle bore of the shaft 31, the latter being in the nature of a sleeve. Upon the other end of the shaft 21 is an arm 25 carrying on its outer end a follower which enters the groove in a cam 26 carried by the shaft 13' to which the gears 13 and 14, previously mentioned, are secured. This shaft is turned by engagement of the gear 13 with the gear ring 12 of the main fish carrier. The movement of the be-heading knife 2 may thus be timed and it may be given an acceleration and a retardation and position as best fits it for doing the work required.

Figure 13:
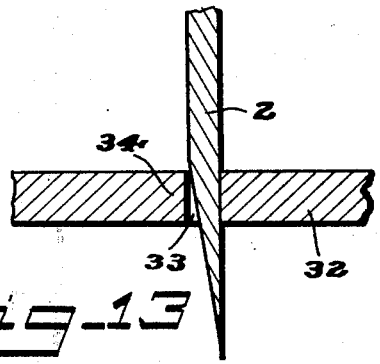
Figure 13 is a section which shows the relationship existing between the be-heading knife and the slotted guide plate which cooperates therewith in be-heading the fish.

In connection with the be-heading knife 2 I have provided means cooperating therewith which provides a complemental cutting edge, and means for also firmly holding the knife up to this cutting edge during its cutting action. A bar or plate 32 extends close alongside of and outside of the positioning chain 35. This is provided with a slot as 33 shaped to correspond with the transverse outline of the knife. A portion of the bar 32 extends as a bar 34 at the outer side of the slot 32. This latter bar 34 at some point in its length, preferably where the point of the knife 2 enters a slot 33, is positioned from the edge of the slot 3 which forms the cooperative cutting member, so that the side of the plate opposite that at which the cutting edge is located, will bear against the same. The cutting edge of the blade 2 is beveled all on one side of the blade, as is clearly shown in Figure 13, which also illustrates the relationship between the above parts. As the cutting blade 2 fills the slot 33, at least in one or more points of the length thereof, the cutting edge of the blade will be held close up against the cutting edge of the slot 33, thereby insuring a perfect shear action. Such construction insures a more perfect cut than if the cutting edge of the blade were positioned even a very slight distance away from the cutting edge of the plate 32. It will therefore perfectly cut the fish with the edge much duller than would be operative if not so supported.

It is evident that the exact conformity of the cut made in be-heading the fish, with the outlines of the fish gills, depends upon proper angular position of the fish upon the conveyor belt or apron 3. This is illustrated in the diagram, Figure 14, wherein the heavy black line 2 represents the position of the cutting blade in which the cut is secured very close to the gills of the fish. The dotted position 2' indicates how the variation in the angular position of the fish might secure cutting at considerable distances from the gills. To facilitate securing such accurate positioning of the fish in its angular position upon the carrier, I have indicated a means which I have found to be satisfactory, in Figure 3. In this view, the broken or dotted line 28 represent the outlines of a table or preliminary receiving surface. This is stationary and located as little above the conveyor 3 as will prevent any interference between the two. The angular position of the edge of this table, which extends over the conveyor belt 3, is made that which the fish should occupy upon the conveyor. This table may be positioned by adjustment so that the edge which extends over the conveyor may be adjusted so as to secure the exact angular position.

In the type of machine shown in the patent to Smith, referred to, the two rings 10 which form the carrier for the fish are continuously revolving. They carry a series of pins which are inserted into the back portion of the fish as it is laid into the groove between the two rings. Two pins of this sort are shown at 19 in Figure 3. The fish are presented to the carrier rings in a position in which the length of the fish extends approximately in the direction of a radius of the ring. The tail end of the fish is first presented to the ring in this position and enters between the two rings. This is done at a point such that one pair of pins of one set carried one by each of the rings, is automatically projected so as to catch and enter the fish close up to its tail. The forward turning of the carrier rings 10 causes the body of the fish to swing into position so as to lie in the groove between the carrier rings and the other set of pins are then projected so as to enter the back portion of the fish at points distributed along its length, and thereby hold the fish firmly for the action of the various mechanisms thereon.

In former practice the presentation of the fish to the carrier rings was by hand and with nothing to determine the exact amount of insertion between the rings except the judgment and skill of the operator. The tail of the fish is cut off by a saw 3, shown in Figure 2, which lies close to and within the carrier rings. As the fish is swung upward after engagement of the tail end thereof by the pins 19 of the first set, it comes in contact with the saw 4 which cuts off the tail. With hand presentation of the fish to these carriers it is evident that the point of engagement of the pins 19 with the tail end of the fish might vary considerably in the length of the fish. This would correspondingly vary the point at which the cut is made which removes the tail. It often happens that this causes waste of a material portion of the fish. To prevent such waste and to insure uniform positioning of the fish as it is presented to the carrier, I have provided a stop mechanism which is shown in detail in Figures 8 and 9, and in association with the other parts in Figure 3.

The fish upon the endless apron 3, after having the head removed therefrom is dropped into a trough 40. The placing of the fish upon the conveyor 3 is such that the back of the fish is forward, that is, towards the end where the trough 40 is located. In consequence the fish drops into this trough in which it rests with its back down. This trough is preferably slightly inclined towards the carrier rings 10. At the end of the trough next to the carrier rings and close outside the latter, are provided two spring-held stop plates 41. These are pivoted at their lower ends upon pivots 42 so that they may be separated from each other. To insure uniform and symmetrical movement between the two stop pivots 41, segment gears 43 may be secured thereto at their pivot ends. A bolt 44 passes through both of these arms and has surrounding it a coil spring 45 which presses against one of the arms and against an adjusting nut 46 whereby these arms are held together in a yielding manner and by a pressure which is adjustable by adjustment of the nut 46.

Figure 8:
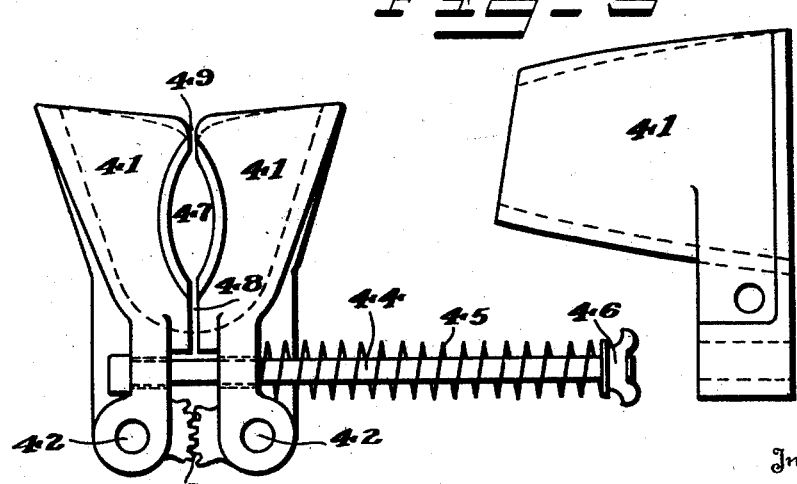
Figure 8 is an elevation showing the side which is next to the carrier of the device which is employed for limiting the inward position of the tail end of the fish when it is presented to the carrier.

These two plates 41 are shaped so as to somewhat conform to the shape of the tail end of the fish, excepting that they open freely upward except at their inner ends where they preferably are drawn fairly close together, as shown in Figure 8. The inner ends of these plates, that is the ends which are closest to the carrier rings 10, are slightly hollowed so as to form an opening 47 closely approximating in size and shape to the cross sectional outline of the tail end of the fish. Above and below the opening 47, slots 48 and 49 should be left for the free passage of the tail fin. As the fish is slid down the trough 40 towards the carrier rings, the tail fin will pass freely through the slots 48 and 49 and the body of the fish will be engaged by the edges of the plates 41 so as to closely determine the amount of entrance of the tail end of the fish between the rings 10. Adjustment for larger or smaller fish may be secured by adjustment of the nut 46. By this means accurate positioning of the fish in presentation to the carrier rings 10 may be secured so that the cutting off of the tail may be done close up to the fin and no loss of valuable meat occur.

As the fish is swung upward and to secure accurate presentation of the rest of the body to the carrier ring, guide rings as 5 are provided which engage the fish at each side and prevent lateral movement thereof until it is secured upon the carrier ring. The next operation performed upon the fish is the removal of, first, the anal fin, and then of the two ventral fins or those which are located on the belly of the fish. It is understood that the fish is positioned upon the carrier rings with its belly outward and is moved tail first. The mechanism for removing these fins is shown in some detail in Figures 6 and 7. The saw by which the fins are engaged and removed is a single cup or pan-like structure 50, the shape of which is clearly shown in said figures. This is mounted upon a shaft 51 which is rotated by a mechanism corresponding essentially with that of the Smith patent previously referred to. The present mechanism differs most radically from that described in said Smith patent, in that the Smith patent illustrated and claimed two cup-like saws which nest together and revolve in opposite directions. The present structure employs a single revolving saw and with this two pressers which engage the fish and which cooperate to also support the fins while being removed. The double cup structure of said Smith patent, while adding to the expense of construction, also adds to the expense of operation because of the frictional resistance caused by the revolution of the two saws in close contact with each other. I have found that a single saw may be employed if the fins of the fish are properly supported at the instant of action thereon by the saw.

Figure 12:
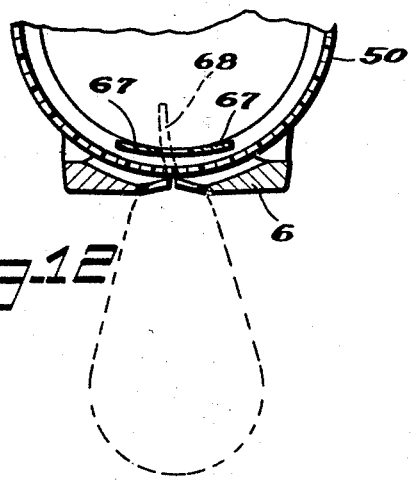
Figure 12 is a transverse cross section through the presser plates, just in front of the finning knife shown in Figures 6 and 7.

To secure proper guidance of the fins and support them during their removal, I have provided as one part a pair of guide fingers 6. These have their operating ends or the ends which engage the fish and the fins referred to, converging toward the saw, as illustrated in Figure 6. These are part of two bars which are pivoted at 60 so that they may swing apart and come together. These are also provided with meshing segment gears 61 to secure symmetrical movement thereof and are held together by a spring 45 similar in construction and operation to the spring 45 of the stop device shown in Figure 8. In fact the structure of the stop device and of the pair of presser fingers shown in Figure 6 are alike excepting as to the shape of the operating ends thereof. A second presser 65 is carried by an arm 66 which is secured to the frame in which the shaft 51 of the saw 50 is journaled so that they will move together. The presser fingers 6 are also mounted upon the end of the same frame 62 in which the shaft 51 is journaled. The presser 65 is made of thin sheet metal so that it may have a certain amount of spring action. It is provided with a slot as 66 along the central axis thereof of such a width as to accommodate therein a centrally positioned fin on the fish. The two branches 67 of this presser extend into the cup of the saw 50 lying close over the cutting edge thereof. There should, however, be a sufficient clearance between the ends of these presser fingers 67 and the saw to accommodate the ends of the belly or ventral fins. The anal fin, which is first presented to the saw, will enter the slot 66' and be held extending outwardly as is illustrated in Figure 12. Such fin 68, when the saw begins to act thereon will be given a side support by engagement with one of the fingers 67 of the upper presser. It will therefore be supported so that the action of the saw in its removal will be certain.

As the fish advances, the two belly fins, located close to the central line, will be presented to the cutter. The converging edges of the presser fingers 6, bearing upon the surface of the fish, will engage under these fins and lift them up. They will at the time be extending somewhat horizontally and as lifted up will contact with the lower surface of the fingers 67 of the upper presser. These will prevent their being lifted upwardly too far. The engagement of the inner edges of the fingers 6 will cause the outer ends of these fins to be pressed against the bottom of the fingers 67 so that as the fish advances the ends of these fins will enter between the saw and the fingers 67, as has been indicated in Figure 16, wherein 68 represents the fin in this position. These fins are in this manner firmly held while the saw acts to remove them. In practice we have found that the result of these various parts is to slightly lift the body of the fish between these two fins so that as the fins are removed a small portion of the skin of the fish between these fins is also removed.

A saw 50', in construction similar to the saw 50 except that the cup form is flatter and more after the nature of a saucer, is mounted in a frame 4' in which frame the tail cut-off saw 4 is also mounted. This is on the inside of the carrier rings 10 and engages and removes the back fins as the fish pass. A pair of saws 50'' are so mounted on the outside of the carrier rings 10 as to remove the pectoral fins which are farther removed from the central line of the fish than those which are removed by the single saw 50. Each of these saws is mounted and operated similar to the saw 50 and is or may be provided with similar pressers. These saws differ from the saw 50 only in size and in each being mounted a little to one side of the central plane.

As the fish pass these saws they are then engaged by the slitter saw 7 which slits open the belly of the fish after the manner of the former machine. It next engages a revolving scraper 70 which removes the entrails and roughly cleans the interior of the fish. As they pass along they later engage a second scraper 71, which in its construction is quite similar to the scraper 70. It differs from the latter, however, in this, that while the scraper 70 revolves so that its fish engaging surface in revolving moves in the same direction as the fish, the scraper 71 revolves in an opposite direction whereby its fish engaging surface moves in a direction in opposition to that of the fish. There is also this difference, that the blades of the scraper 70 are not sharp but are dull, while the blades of the scraper 71 are made with sharp edges or corners so that in the latter case a cutting action may take place.

Each of these scrapers has a central section 72 of a bulbous outline and has end sections 73 which are slightly coned with the large end of the cone next to the central section 72. All of these sections are provided with outwardly projecting blades 74 which blades are preferably given a slight helical inclination, the direction of this inclination being such that the slight lateral pushing effect which may be imparted thereby to the fish will tend to move the flanks of the fish outwardly from the central line. The scraper 71 is also provided centrally of its length with a thin disk 75 which is designed to act as a cutter to cut through the membrane which lies between the main abdominal cavity of the fish and the blood sac, so as to cut this membrane and expose it to the cleaning action of the scraper.

Associated with each of these revolving scrapers 70 and 71 is a shield or guard plate 76. This is molded in transverse outline to conform with the exterior longitudinal contour of the scraper, and this is intended to correspond also with the transverse contour of the inner surface of the fish after it has been slit and spread out, as is indicated in Figure 4. The shield or guard plate 76 is mounted so that it may be angularly adjusted about an axis which corresponds with the rotative axis of the scraper 71. The edge thereof is mounted so as to be close to but not contact with the peripheral surface of the scraper as it revolves. The manner of so mounting this for adjustment may vary. The construction which I have illustrated is to provide arms 77 which are secured to each end of the shield or guard plate and which are provided with segmental circular flanges 78 which contact with corresponding segmental portions 79 of a casting which is secured to the frame in which the rotative scraper 71 is journaled. One of these members, as the bar 79, is provided with a slot or slots 79' which receives a bolt 78' which enters the other member and whereby the two may be securely clamped in adjusted position.

It is evident that by angular adjustment of the shield or guard plate 76 this may be caused to act more or less strongly as a presser upon the body of the fish as it passes, to thereby regulate the force of contact of the revolving scraper with the fish. This adjustment may be varied so that the force of contact may be very slight or so that it may be very heavy. In consequence, by careful adjustment the action of the scraper may be made such that the membrane or skin which lines the abdominal cavity of the fish may be thoroughly cleansed or entirely removed. I have found that this type of scraper, together with the possibility of adjustment and the action of the guard plates or shield 76, will secure substantially perfect cleaning action.

It will be noted by reference to Figure 4, that the carrier rings 10 are recessed back outwardly of the central plane from the point where the inclined portion 11 forming the trough, ends. This point is represented in Figure 4 by the reference Figure 10'. Mounted in this recess are spring-held and yielding plates 8. These extend in an angular direction outside of the rings 10 throughout that portion which contains the rotative scrapers 70 and 71 and also any portions in which may be mounted any brushing device designed to act upon the interior surface of the fish. These bars are made of material which in its composition and size is such that they will freely bend and yield. They are also mounted upon arms 80 which are pivoted at the point 81 and which are acted upon by springs so that they may also swing bodily. Springs 82 are coil springs which surround a rod 83 which has an adjusting nut 84 thereon by which the tension of these springs may be adjusted. These rods 83 connect with one arm of the lever 80, the action of these parts being the same as that of the springs shown in Figure 6 and controlling the action of the presser fingers 6.

This type of construction furnishes a yielding support for the back sides of the flanks of the fish so that they are held yieldingly up to the revolving scrapers. They will yield as may be necessary for fish having different thicknesses of flanks and will furnish such a gentle support therefor that tearing of the flesh will not be likely to occur by action of the scrapers thereon.

The scrapers 70 and 71 are similarly mounted so as to be movable bodily towards and from the carrier. This means comprises a frame 9 pivoted as at 90 and held yieldingly towards the carrier by springs 91, which are mounted and adjusted in the manner just described for the spring controlling the action of the arms 80. Any suitable means for yieldingly holding these springs and the scrapers carried thereby towards the carrier may be employed.

The finning saw 50 is mounted in a frame 52 which is pivoted at 53 permitting bodily movement of the saw and its associated parts. A spring 56 may be adjusted to support whatever proportion of the weight of these parts may be desired. The second pair of finning saws, 50″, are similarly mounted in a frame 55 pivoted at 54. As similar frames similarly supported and the saw-driving mechanism are old in the art, as in the Smith Patent No. 1,034,525, referred to, their specific construction and the manner of driving the saws have not been herein described.

What I claim as my invention is:

1. In a fish dressing machine, a feed chain having fish positioning means thereon and means for giving said chain movement in a cycle of variable rate.

2. In a fish dressing machine, a feed chain having fish positioning means thereon, and actuating means for said chain containing elliptical driving gears.

3. In a fish dressing machine, a feed chain having fish positioning pins, and an elliptical gear train driving said chain.

4. In a fish dressing machine, a feeding device comprising an endless fish carrying apron, an endless chain connected to move in time with and alongside the apron and having fish positioning means, said chain stopping short of the apron at its delivery end, and a fish treating means acting upon the fish after being released by the chain and while still supported by the apron.

5. In a fish dressing machine, a fish feeding endless apron, an endless chain extending alongside of the apron and at one end connected with the apron to be turned thereby, the other end of the chain stopping short of the apron, said chain having positioning pins adapted to engage and accurately position the fish, a beheading knife adapted to engage the fish after disengaged by said pins, and actuating means for the fish feeding means and for the knife.

6. A fish feeding device for fish dressing machines comprising an endless fish carrying apron and an endless belt extending alongside of the receiving end of the apron, said belt having fish positioning means, a common actuating means for said apron and belt and means for giving a periodically variable rate of movement to said apron and belt.

7. In a fish dressing machine, a fish beheading means, a feeding means presenting the fish to the beheading means, separate means for actuating each of said mechanisms at periodically varying rates and coordinated to secure the beheading action during the slowest part of the feeding movement.

8. A fish presenting means for fish dressing machines comprising a progressively moving member having positioning plates which at their base are of a width and curvature to substantially fill the gill opening of the fish.

9. A fish presenting means for fish dressing machines comprising a progressively moving member having positioning plates which at their base are of a width and curvature to substantially fill the gill opening of the fish, and are reduced in width towards their outer ends.

10. A fish presenting means for fish dressing machines comprising an endless belt having gill-entering webs projecting therefrom and curved in their width to correspond with the curvature of the fish gills.

11. In a fish dressing machine, a movable carrier belt for presenting the fish to the operating mechanism, a fish positioning means associated with said carrier belt and a delivery table having an edge extending over the receiving end of the carrier belt, said edge being angularly positioned to correspond with the desired angular position of the longitudinal axis of the fish upon the carrier belt.

12. A fish presenting device comprising a progressively moving member having gill-entering fins sloping on their front and rear edges and adapted to substantially fill the gill opening.

13. A fish presenting device comprising an endless apron serving as a fish carrier, and a fish positioning member located along one edge of said carrier and having gill-entering fins and means for moving said apron and positioning member to advance the fish in like direction and rate.

14. In a fish dressing machine, a fish-beheading knife, means for periodical operation of said knife, a movable carrier for presenting the fish to the knife, fish positioning fingers carried by said carrier and engaging the head end of the fish to properly register the fish with the cutter, and means for determining the angular position of the fish upon the carrier.

15. In a fish dressing machine, a fish beheading knife, means for periodical operation of said knife, a fish carrier presenting the fish to the said knife, means for accurately positioning the head end of the fish upon the carrier, and means for determining the angular position of the fish upon the carrier.

16. In a fish dressing machine, a fish-beheading knife, knife operating means, an endless belt for presenting the fish to the knife, and fish positioning pins carried by said belt and having a curvature and transverse width corresponding approximately with the extent of the available gill opening of the fish.

17. In a fish beheading machine, a reciprocating knife having the bevel of its cutting edge at one side thereof and a cooperating cutting member comprising a plate having a knife-receiving slot shaped to have the cutting edge of the slot conform to the projected outline of the cutting edge of the knife.

18. In a fish beheading machine, a reciprocating knife having its cutting edge beveled on one side only, a cooperating cutting member having an outline conforming to the projected outline of the cutting edge of the knife and a supporting member engaging the back face of the knife to hold its cutting edge in close engagement with the cutting outline of its cooperating cutting member.

19. In a fish dressing machine, a fish carrier, a finning cutter comprising a rotative cup having its rim forming a cutting edge, a presser having two separated fingers adapted to receive the fin between them and with their ends extending over the cutting edge of the finning cutter to thereby provide a side support for the fin during cutting thereof.

20. In a fish dressing machine, a cup-like rotative cutter having its lip constituting a cutting edge and the outer face adjacent to the lip beveled to serve as a presser for engaging the fish body, and a combined presser and guide supported in common with the cutter and engaging the fish in advance of the cutter.

21. In a fish dressing machine, a cup-like rotative cutter supported for yielding movement towards and from the fish, the lip of said cutter forming its cutting edge, and a presser supported in common with the cutter and engaging the fish in advance of the cutter, the end of said presser extending over the cutting edge of the cutter to form a side support for the fins while being cut.

22. In a fish dressing machine, a rotative cup-like cutter, a presser engaging the fish in advance of the cutter and having its end extending over the cutting edge of the cutter, and a side edge positioned to form a side support for a fin while being cut.

23. In a fish dressing machine, a finning device comprising a rotative cup-like cutter, a presser engaging the fish in advance of said cutter and extending back under the cutting edge, and a second presser extending from in advance of the cutter over the cutting edge and being separated from the cutting edge to permit passage of the ventral fins between said last named presser and the cutting edge of the cutter.

24. In a finning device for fish dressing machines, a rotative cup-like cutter having the edge of its lip forming a cutting edge, a combined fin guide and presser having two arms engaging the fish in advance of the cutter and with their inner edges converging towards the cutter, and a fin holding presser outwardly of the first named presser and having its end extending over the cutting edge of the cutter and separated therefrom to accommodate the ventral fins between them.

25. A finning device for fish dressing machines comprising a rotative cup-like cutter, fin guides having edges converging towards the cutter and a presser extending over the edge of the cutter and separated therefrom to accommodate the ventral fins between them.

26. A finning device for fish dressing machines comprising a rotative cup-like cutter, fin guides having edges converging towards the cutter and a presser extending over the edge of the cutter and separated therefrom to accommodate the ventral fins between them, said presser having a central slot adapted to receive the anal fin.

27. A finning device for fish dressing machines comprising a fin cutter, a presser having converging edges forming a V-shape and engaging the fish just in advance of the cutter, and a second presser outside of the first named presser and extending over the edge of the cutter and separated therefrom to accommodate the ventral fins between it and the cutter.

28. A finning device for fish dressing machines comprising a fin cutter, a presser having converging edges forming a V-shape and engaging the fish just in advance of the cutter, and a second presser outside of the first named presser and extending over the edge of the cutter and separated therefrom to accommodate the ventral fins between it and the cutter, and also having a central slot adapted to receive the anal fin.

29. A finning device for fish dressing machines comprising a fin cutter, a presser engaging the fish in advance of the cutter and having two laterally separable arms resiliently held towards each other, said arms having converging opposed edges adapted to engage and raise the ventral fins, and a second presser extending over the space between the arms of the first presser and over the cutting edge of the cutter.

30. A finning device for fish dressing machines comprising a cutter, a V-shaped presser engaging the fish to raise the fins, and a second presser outside of the first presser and extending over the cutting edge of the cutter.

31. A finning device for fish dressing machines comprising a cutter, a V-shaped presser with edges converging towards the cutter and a second presser covering the opening between the sides of the first presser and extending over the cutting edge of the cutter.

32. A finning device for fish dressing machines comprising a fin cutter, a presser extending between the cutter and the fish and having diverging tips extending in advance of the cutter, and a second presser covering the space between said diverging tips and extending over the cutting edge of the cutter.

33. A finning device for fish dressing machines comprising a cup-like rotative cutter, a pair of presser arms having diverging ends extending in advance of the cutter, said arms extending rearward beneath the cutter and pivoted rearward of the cutter to be separable at their front end, a spring holding said arms toward each other and a second presser extending over the space between said arms in advance of the cutter and over the cutting edge of the cutter.

34. A finning device for fish dressing machines comprising a cup-like rotative cutter, a pair of presser arms having diverging ends extending in advance of the cutter, said arms extending rearward beneath the cutter and pivoted rearward of the cutter to be separable at their front end, a spring holding said arms toward each other, a second presser extending over the space between said arms in advance of the cutter and over the cutting edge of the cutter, said second presser having a central slot adapted to receive the fins which are located upon the median line of the fish.

35. A rotative cutter for fish dressing machines having a cup-like form with the exterior thereof having a narrow beveled band just back of the cutting edge and adapted to function as a presser surface to limit the depth of its cut.

36. A fin removing device for fish dressing machines comprising a shallow cup-like cutter mounted to rotate about its central axis, and a presser engaging the fish in advance of the cutter, said cutter and presser being mounted upon a common support.

37. A fin removing device for fish dressing machines comprising a shallow cup-like cutter mounted to rotate about its central axis, and a presser engaging the fish in advance of the cutter, and a frame member pivoted to swing toward and from the fish and carrying the cutter and presser.

38. In a fish dressing machine, a fish carrier provided with means for securing a fish thereon and moving the same tail first in the direction of its length, a fin cutter having a cup-like shape rotative about its axis and presenting its cutting edge to the moving fish, and two pressers supported in common with the cutter, one having converging fin raising arms in advance of the cutter and the other outside of and covering the space between said converging arms and extending over the cutting edge of the cutter.

39. In a fish dressing machine, a fish carrier, scrapers engaging the fish upon said carriers, and yielding supporting plates for the flanks of a split fish while passing the scrapers.

40. In a fish dressing machine, a fish carrier, scrapers engaging the fish upon said carriers, and yielding supporting plates for the flanks of a split fish while passing the scrapers.

41. In a fish dressing machine, two separated carrier rings having means for securing the fish between them, the exterior periphery of said rings having a zone upon each of reduced diameter extending under the flanks of a split fish carried thereby.

42. In a fish dressing machine, a ring-like carrier having a peripheral groove for the reception of the back zone of a fish body, and outwardly of said groove being reduced in diameter, and resiliently supported plates lying without said reduced-diameter zones.

43. In a fish dressing machine, a fish carrier adapted to support the fish along its central or back zone, spring plates lying at each side of said central zone and adapted to support the flanks of a split fish carried by said carrier, and spring held arms carrying said spring plates.

44. In a fish dressing machine, a fish carrier adapted to support the fish along its central or back zone, spring plates lying at each side of said central zone and adapted to support the flanks of a split fish carried by said carrier, spring held arms carrying said spring plates, and rotative scrapers engaging the outer faces of the fish outwardly of said spring plates.

45. In a fish dressing machine, a fish carrier, a rotatable scraper positioned to engage the outwardly faced surface of a split fish carried by said carrier, yielding presser plates yieldingly holding outwards the flanks of the split fish, and a guard plate insertible between the fish and the scraper to determine the extent and force of action of the scraper upon the fish.

46. In a fish dressing machine, a rotative fish carrier, a revolving scraper engaging the opened interior surface of a fish upon the carrier, yielding plates beneath and supporting the fish while passing the scraper, and a guard plate mounted to swing about the axis of the scraper and adjustably insertible between the fish and the scraper.

47. A scraping device for fish dressing machines comprising a revolving scraper having scraping blades extending lengthwise thereof, a guard plate having an edge positioned between the scraper and the fish, the scraper being turned to cause its scraping blades to be moved toward said edge of the guard plate.

48. A scraping device for fish dressing machines comprising a revolving scraper and a combined presser and guard plate insertible between the scraper and the fish to determine the action of the scraper upon the fish.

49. A scraping device for fish dressing machines comprising a revolving scraper, a combined presser and guard plate having an edge close outside of the scraper and between the scraper and the fish, and means for adjusting said plate to vary the extent of engagement between the scraper and the fish.

50. In a fish dressing machine a fish carrier, a rotative scraper and a guard adjustable to swing about the axis of the scraper and insertible between the scraper and fish to determine the exact point at which the fish is exposed to the action of the scraper.

51. A scraping device for fish dressing machines comprising a revolving scraper and a combined presser and guard plate insertible between the scraper and the fish to determine the action of the scraper upon the fish, said scraper being turned to cause its acting surface to move towards the edge of said blade.

52. A scraping device for fish dressing machines comprising a revolving scraper having scraping knives extending lengthwise thereof and having a longitudinal outer contour adapting it to engage the interior surface of a fish when split and opened out, said scraper also having a transverse centrally positioned disk slightly projecting beyond the knives and adapted to cut the membrane of the blood sac, and a combined presser and guard plate having a transverse shape conforming to the contour of the scraper and with an edge lying between the scraper and the fish and closely adjacent to the revolving scraper.

53. A scraping device for fish dressing machines comprising a revolving scraper having lengthwise extending scraper blades, and a centrally positioned disk mounted perpendicular to the axis of revolution and extending slightly beyond the path of the blades, a guard plate mounted to swing about the rotative axis of said scraper and having an edge interposed between the scraper and the fish with said edge close to the path of revolution of the scraping blades.

54. A scraper device for fish dressing machines comprising a revolving scraper adapted to engage the inner surface of a fish when slit and opened out, a combined presser and guard plate having an edge adapted to enter between the scraper and the fish, and an adjustable support for said plate comprising circular segmental flanges and complemental grooves, one connected with the said guard plate and the other fixed concentric with the axis of the scraper.

55. A scraper device for fish dressing machines comprising a revolving scraper adapted to engage the inner surface of a fish when slit and opened out, a combined presser and guard plate having an edge adapted to enter between the scraper and the fish, an adjustable support for said plate comprising circular segmental flanges and complemental grooves, one connected with the said guard plate and the other fixed concentric with the axis of the scraper, and a spring plate spring supported extending back of the flanks of the fish while passing this scraper.

56. The combination in a fish dressing machine of a revolving carrier having a central gap for the reception of the tail end of the fish, fish gripping means mounted on said carrier and automatically operable at a fixed point in the travel of the carrier, a feeding guide extending outwardly from said carrier and a limit guide engaging the fish outwardly of the carrier to determine the extent of insertion of the fish within the gap in the carrier.

57. In a fish dressing machine of the type described, a limit guide for accurately determining the presentation of the fish to the carrier comprising a pair of arms extending with and opening in the direction of movement of the carrier and positioned to receive the tail end of the fish between them by a tail-first lengthwise movement of the fish to the carrier.

58. In a fish dressing machine of the type described, a stop limiting the movement of the fish in presenting it to the carrier comprising two arms spring held together and opening in the direction of movement of the carrier and adapted to receive the tail end of the fish between them, and means for adjusting the clamping action of said arms.

59. A stop for accurate positioning of the fish in presenting it to the carrier, comprising two pivoted arms extending in the direction of movement of the carrier and carrying plates adapted to fit over the fish at its tail end and springs yieldingly holding said plates together.

60. A means for presenting fish to the carrier of fish dressing machines of the type described, comprising a directing trough and a pair of fish clamping plates at the end of the trough next to the carrier adapted to act as a stop.

61. A means for presenting fish to the carrier of fish dressing machines of the type described, comprising a directing trough and a pair of fish clamping plates at the end of the trough next to the carrier adapted to act as a stop, said plates being movable towards and from each other, means connecting said plates to secure symmetric movement thereof, and a spring holding them together.

62. A revolving scraper for a fish dressing machine having a central bulbous enlargement and terminal slightly coned sections at each side thereof merging in contour with said central section.

63. A revolving scraper for fish dressing machines having a central enlarged section of rounded contour and a slightly projecting cutting disk at the center of said section, and terminal sections of slightly coned shape merging in contour with said central section.

64. A revolving scraper for fish dressing machines having a central enlarged section of rounded contour and a slightly projecting cutting disk at the center of said section, and terminal sections of slightly coned shape merging in contour with said central section, said scraper having scraping ribs extending lengthwise thereof and having a slight helical incline, said incline being in opposite directions at opposite sides of the center.

Signed at Seattle, King County, Washington, this 29th day of June, 1923.

EDWARD H. WAUGH.